United States Patent [19]
Kondo

[11] Patent Number: 4,464,694
[45] Date of Patent: Aug. 7, 1984

[54] TAPE RECORDER

[75] Inventor: Makoto Kondo, Tokyo, Japan

[73] Assignee: Olympus Optical Co., Ltd., Tokyo, Japan

[21] Appl. No.: 245,220

[22] Filed: Mar. 19, 1981

[30] Foreign Application Priority Data

Mar. 21, 1980 [JP] Japan ................................. 55-37725
Mar. 21, 1980 [JP] Japan ................................. 55-37726

[51] Int. Cl.³ .............................................. G11B 1/00
[52] U.S. Cl. ................................................. 360/137
[58] Field of Search ............... 360/137; 200/340, 324, 200/159 B; 340/365 R, 365 P, 365 C; 369/10, 12

[56] References Cited

U.S. PATENT DOCUMENTS

| | | | |
|---|---|---|---|
| 3,805,086 | 4/1974 | Carson et al. | 340/365 R |
| 4,001,893 | 1/1977 | Yamamoto | 360/137 |
| 4,181,823 | 1/1980 | DeLamoreaux et al. | 369/10 |
| 4,258,402 | 3/1981 | Sato | 360/137 |

Primary Examiner—John H. Wolff
Attorney, Agent, or Firm—Toren, McGeady and Stanger

[57] ABSTRACT

A tape recorder consisting of a main body, a cassette lid which opens and closes the cassette room and touch-type switches provided on the cassette lid to execute various types of operation modes.

13 Claims, 9 Drawing Figures

TAPE RECORDER

BACKGROUND OF THE INVENTION

1. Field of the Invention

This invention relates to a tape recorder which has, on its cassette lid, touch-type switches to perform operations such as recording, playback, stop, etc.

2. Description of Prior Art

In recent years, rapid technical progress has greatly promoted the miniaturization of tape recorders. Up until now, in some handy-type tape recorders, as shown in FIG. 1, cassette chamber 2 to load a cassette tape and speaker's sound holes 3 are provided on the upper surface of main body 1 and a slide switch 4 to set the operation modes for recording (REC), playback (PLY) and stop (STOP) on one of the side faces. In other handy-type tape recorders, as shown in FIG. 2, cassette room 2 and speaker's sound holes 3 are provided on the front face of main body 1 and pushbutton switches 5a, 5b and 5c for recording (REC), playback (PLY) and stop (STOP) on one of the side faces of the main body.

In such small-size tape recorders, since they have to use a cassette tape whose size is regulated by standards, a large space is occupied by cassette room 2 and, therefore, most of the front-face of main body 1 is taken by the cassette room and the sound holes of the speaker 3. As a result, slide switch 4 or pushbutton switches 5a, 5b and 5c to execute various operation modes are provided on one side face of the main body.

However, as tape recorders get miniaturized, they also become thinner. Because of this, it has become necessary to use smaller side switches 4 and pushbutton switches 5a, 5b and 5c. However, if switches 4 or 5a, 5b and 5c are made excessively small, an unexpected error when operating the switches is likely to occur, thereby limiting the efficacy of the system.

In order to assure operability, sufficient space to mount slide switch 4 or pushbutton switches 5a, 5b and 5c must be secured. This makes it difficult to produce small-size tape recorders.

SUMMARY OF THE INVENTION

One object of the present invention is to eliminate the above described drawback of the tape recorder.

The other object of this invention is to furnish touch-type switches to execute various operation modes such as recording, playback, stop, etc. on the cassette lid which opens and closes the cassette room, whereby providing small tape recorders without impairing their operability.

A tape recorder of the present invention comprises a tape recorder main body equipped with a cassette chamber, a cassette lid to open and close the cassette chamber and touch-type switches provided on the cassette lid to perform various types of operation modes. The main body of the said tape recorder consists of a main biody of a handy-type tape recorder. Moving contacts and fixed contacts, which contact and separate in synchronism with the opening and closing motions of the said cassette lid, are provided between the said cassette lid and the cassette chamber. The touch-type switches are connected to the electric circuit of the said main body of the tape recorder through the intermediary of the moving contacts and fixed contacts. The touch-type switches are arranged on one side of the cassette lid. The touch-type switches are composed of clear electrodes.

DESCRIPTION OF THE PREFERRED EMBODIMENT

Figure 1:
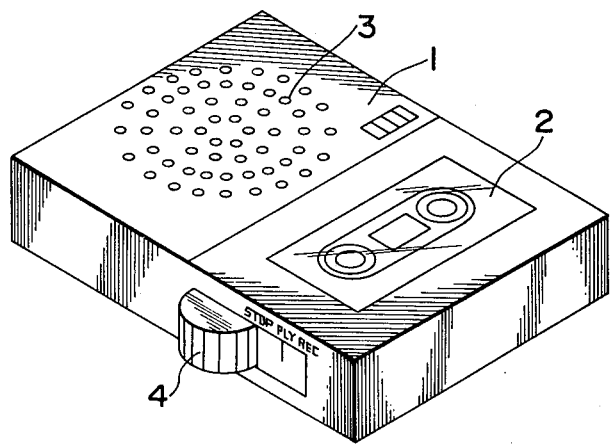
FIG. 1 is an oblique view of an example of conventional tape recorder.
Figure 2:
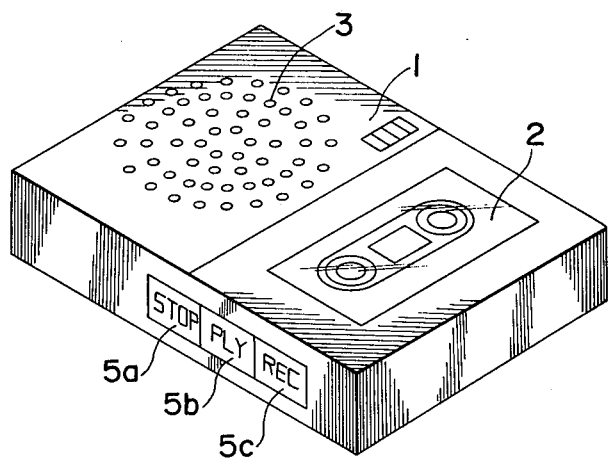
FIG. 2 is an oblique view showing another example of a conventional tape recorder.
Figure 3:
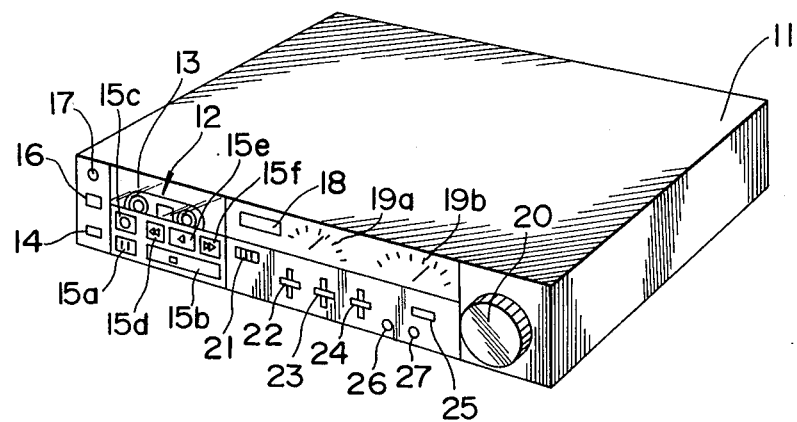
FIG. 3 is an oblique view showing an example of this invention.

FIG. 3 is an illustration of an example of this invention applied to a tape deck. In this drawing, the main body 11 of the tape deck incorporates the electric circuit (not illustrated) including the circuits for various operation modes such as recording, playback, stop, etc. The cassette chamber is provided at the front panel of main body 11 of the tape deck. In this case, main body 11 of the tape deck has a height almost identical to the height of cassette chamber 12 to minimize the dimension in the height of the main body of the tape deck.

Figure 4:
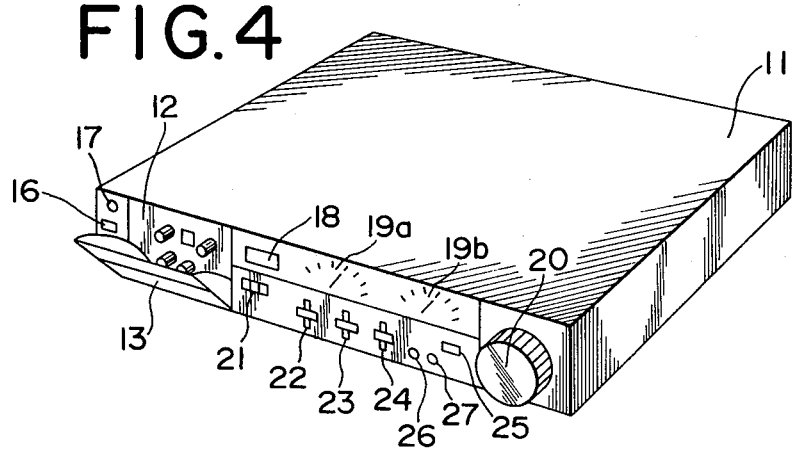
FIG. 4 is an oblique view showing the above example with its cassette lid opened.
Figure 5:
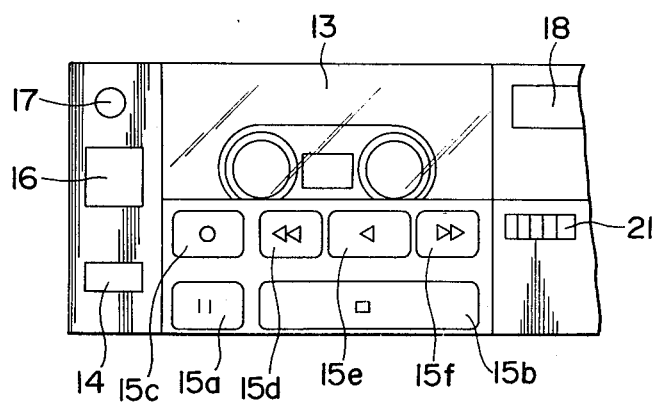
FIG. 5 is the front view showing the enlarged view of an important section of the aforementioned example.

The cassette chamber has cassette lid 13 which can be freely opened and closed. Normally, cassette lid 13 is opened with cassette eject button 14 as shown in FIG. 4. Provided on the front face of cassette lid 13, in order to execute various operations, are touch-type switch 15a for pause, touch-type switch 15b for stop, touch-type switch 15c for recording, touch-type switch 15d for tape rewinding, touch-type switch 15e for playback and touch-type switch 15f for tape rapid feed as shown in FIG. 5. In this case, touch-type switches 15a to 15f are arranged in two rows so one can easily know from outside the remaining amount of tape. Touch-type switches 15a to 15f are electrically connected to the electric circuit in the tape deck 11 through the intermediary of the lead wires which are not illustrated. Further provided on the front panel of tape deck main body 11 are power switch 16, power pilot lamp 17, recording indicator lamp 18, VU meters 19a and 19b to indicate the recording level, recording adjusting knob 20, tape counter 21, Dolby noise reduction switch 22, tape selector switch 23, loudness control switch 24, timer switch 25, headphone jack 26 and microphone jack 27.

When cassette lid 13 is closed as shown in FIG. 3, and after loading a cassette tape in the cassette room, the desired operation modes can be obtained by operating touch-type switches 15a to 15f provided on cassette lid 13.

To replace the cassette tape from cassette room 12, operating eject pushbutton switch 14 opens cassette lid 13 as shown in FIG. 4, in which condition the cassette tape can be loaded or taken out.

In such a tape recorder, where touch-type switches for various operation modes are arranged by making effective use of the space which is occupied by the cassette lid which opens and closes the cassette room, it is possible to provide sufficient space to mount these switches, thereby allowing reliable and easy operability. In addition, it is possible to reduce the space for mounting these switches which is required in a conventional tape recorder and, therefore, the size of the tape recorder can be made smaller because of the reduced space.

Figure 6:
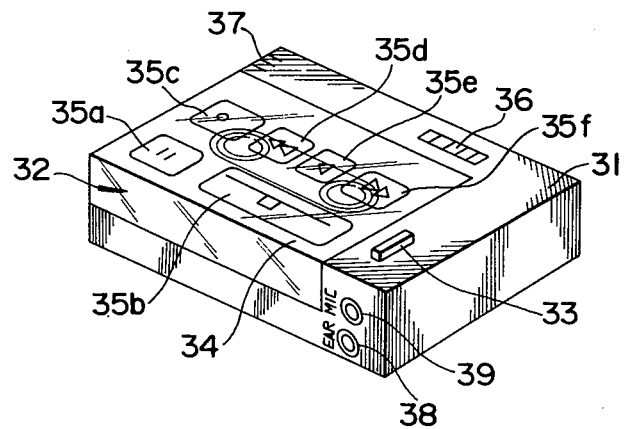
FIG. 6 is an oblique view showing another example of this invention.

FIG. 6 illustrates this invention applied to a convenient handy-type tape recorder. As shown in the figure, a main body 31 of the tape recorder forms a cassette chamber 32 on its front face. Over the cassette chamber 32, a cassette lid is opened with eject button 33. Arranged over the whole area of the front face of cassette lid 34, to execute various operation modes, are touch-type switch 35a for pause, touch-type switch 35b for stop, touch-type 35c for recording, touch-type switch 35d for tape rewinding, touch-type switch 35e for playback and touch-type switch 35f for rapid tape feed. In this case, switches 35a to 35f consist of clear electrodes made of indium oxide or tin oxide, through which the inside of cassette chamber 32 can be seen. FIG. 6 also shows a tape counter 36, a microphone 37, an earphone jack 38 and an external microphone jack 39.

With such a construction, the space of cassette lid 34 which takes up most of the space of main body 31 of the tape recorder can be utilized effectively and, therefore, the same advantages mentioned above can be obtained. It is also possible to see the inside of cassette chamber 32 through touch-type switches 35a to 35f.

Figure 7:
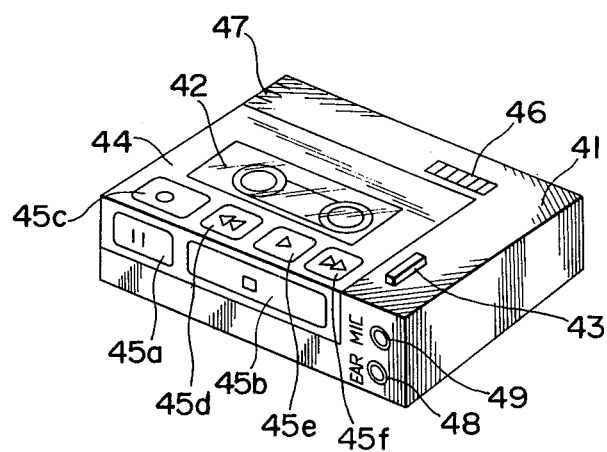
FIG. 7 is an oblique view of a third example of this invention.

FIG. 7, shows another example of the invention. Here, the main body 41 of the tape recorder has cassette chamber 42, on which cassette lid 44 is attached in a manner to be freely opened and closed. However, normally it is opened with eject button 43. Transparent window 44a, through which the remaining amount of the cassette tape is checked, is provided about the center of cassette lid 44. Arranged on one side of cassette lid 44, beside transparent window 44a, that is, over the portion from the front face to the side face of cassette lid 44 as shown in FIG. 7, are touch-type switch 45a for pause, touch-type switch 45b for stop, touch-type switch 45c for recording, touch-type switch 45d for tape rewinding, touch-type switch 45e for playback and touch-type switch 45f for tape rapid feed to obtain the respective operation modes.

This construction, permits the same effects previously mentioned.

Figure 8:
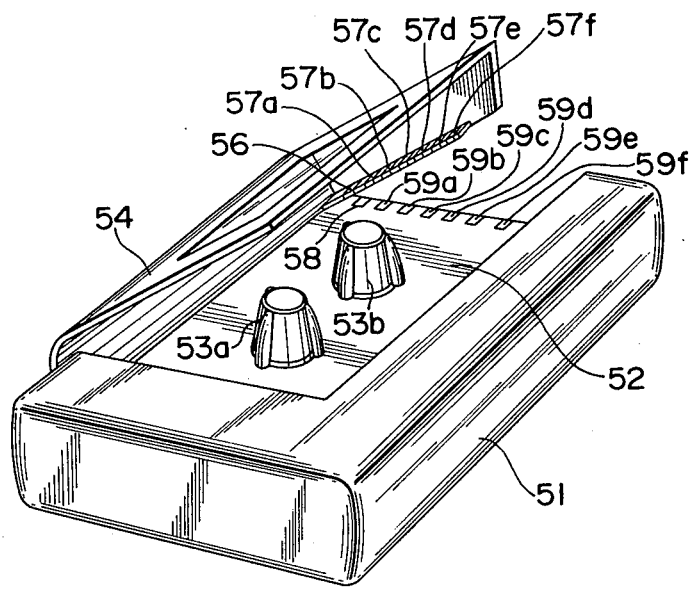
FIG. 8 is an oblique view of a fourth example of this invention.
Figure 9:
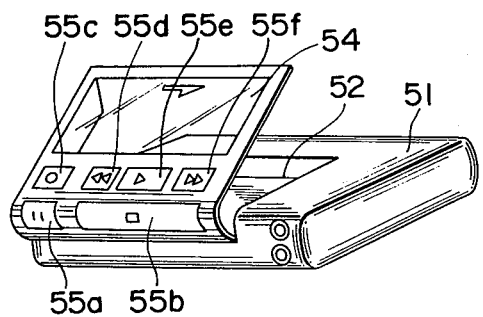
FIG. 9 is an oblique view to illustrating how the touch-type switches are arranged in the example shown in FIG. 8.

Referring to FIG. 8, a description is made of a different example of this invention as follows. In FIG. 8, the main body 51 of the tape recorder has a cassette chamber 52 provided on the front face of main body 51 of the tape recorder. A pair of tape reels 53a and 53b are provided inside cassette chamber 52, over which a cassette lid 54 is attached in a manner to be freely opened and closed. Arranged on cassette lid 54, as shown in FIG. 9, are touch-type switch 55a for pause, touch-type switch 54b for stop, touch-type switch 55c for recording, touch-type switch 55d for tape rewinding, touch-type switch 55e for playback and touch-type switch 55f for tape rapid feed. A number of moving contacts 56, 57a to 57f are arranged in a row along the edge of cassette lid 54. Moving contacts 56, 57a to 57f are connected to the touch-type switches 55a to 55f through the intermediary of lead wires which are not illustrated. In this case, moving contact 56, which serves as a common power source, is connected to all touch-type switches 55a to 55f; other contacts 57a to 57f are connected respectively to touch-type switches 55a to 55f.

On the other hand, a number of fixed contacts 58, 59a to 59f are arranged in a row along the edge of cassette chamber 52 which correspond to said moving contacts 56, 57a to 57f. In synchronism with the opening and closing motions of cassette lid 54, the moving contacts 56, 57a to 57f contact and separate from fixed contacts 58, 59a to 59f. The moving contacts are thus connected through the intermediary of the lead wires, which are not illustrated, to the electric circuits (not illustrated) including circuits for different operation modes.

Therefore, such a mechanism, makes it possible to connect and separate moving contacts 56, 57a to 57f and fixed contacts 58, 59a to 59f in synchronism with the opening and closing motions of cassette lid 54. If any of touch-type switches 55a to 55f is touched inadvertently while cassette lid 54 is open, an erroneous operation is prevented and stable operation is secured. Needless to say, with such a mechanism the same effects as mentioned above can be obtained.

Thus, the present invention is not limited to the above-mentioned examples and can be applied with some modifications as long as the fundamentals of this invention are not changed.

What is claimed is:

1. A tape recorder operable in a plurality of operating modes comprising a main body forming a cassette chamber, a cassette lid to open and close the cassette chamber, touch-type switches on the cassette lid, said cassette lid having a plurality of contacts connected to said touch-type switches, said body having a plurality of contacts, said lid being arranged relative to the body to separate the contacts on the lid from the contacts on the body when the lid is open and to connect the contacts on the body to the contacts on the lid when the lid is closed, said touch-type switches being arranged when the lid is closed for setting the recorder to various operating modes through said contacts.

2. A tape recorder according to claim 1 characterized in that the said main body of the tape recorder comprises the main body of a tape deck.

3. A tape recorder according to claim 1 characterized in that the said main body of the tape recorder comprises the main body of a miniature tape recorder.

4. A tape recorder as in claim 1, wherein the touch-type switches are touch-sensitive switches for setting the recording, playback, and stop modes.

5. A recorder as in claim 1, wherein:
said main body has a plurality of surfaces with two opposing ones of said surfaces being larger than the others of said surfaces;
said cassette lid forming a major portion of one of the larger of said surfaces.

6. A tape recorder as in claims 1, 4 or 5, wherein:
the said main body has substantially smooth and unobstructed surfaces unobstructed by dials when the lid is closed.

7. A tape recorder as in claim 6, wherein:
said lid is hinged near the center of one of the smaller surfaces, and the lid extends from the one of the smaller surfaces over the one of the larger surfaces.

8. A tape recorder as in claim 7, wherein:
said switches extend over the the lid from the one of the larger surfaces to the one of the small surfaces.

9. A tape recorder as in claim 5, wherein said switches have a given orientation and cover a given area and boundary on the lid, and the one of the larger surfaces includes an area outside the lid insufficient to include the given area and boundary of the switches.

10. A tape recorder operable in a plurality of operating modes comprising a main body forming a cassette chamber, a cassette lid to open and close the cassette chamber, touch-type switches on the cassette lid for setting the recorder to various operating modes characterized in that moving and fixed contacts which open and close in response to opening and closing motions of the cassette lid are provided between the said cassette lid and cassette chamber.

11. A tape recorder according to either claim 1 or claim 10 characterized in that the said touch-type switches are arranged on one side of the cassette lid.

12. A tape recorder operable in a plurality of operating modes comprising a main body forming a cassette chamber, a cassette lid to open and close the cassette chamber, touch-type switches on the cassette lid for setting the recorder to various operating modes further comprising moving contacts and fixed contacts and characterized in that the said touch-type switches are arranged to effect the operating modes of the tape recorder through the intermediary of said moving contacts and fixed contacts.

13. A tape recorder according to either claim 1 or claim 12 characterized in that the said touch-type switches comprise clear electrodes.

* * * * *